United States Patent
Kyou et al.

(10) Patent No.: US 9,763,284 B2
(45) Date of Patent: Sep. 12, 2017

(54) WIRELESS COMMUNICATION DEVICE, ELECTRONIC TIMEPIECE AND WIRELESS COMMUNICATION METHOD

(71) Applicant: CASIO COMPUTER CO., LTD., Shibuya-ku, Tokyo (JP)

(72) Inventors: Kazuho Kyou, Tachikawa (JP); Makoto Nakagawa, Ome (JP); Takaomi Yonekura, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/233,700

(22) Filed: Aug. 10, 2016

(65) Prior Publication Data
US 2017/0086253 A1   Mar. 23, 2017

(30) Foreign Application Priority Data

Sep. 17, 2015 (JP) .................................. 2015-183892
May 24, 2016 (JP) .................................. 2016-103253

(51) Int. Cl.
*H04W 76/06* (2009.01)
*H04W 4/00* (2009.01)
*H04L 29/08* (2006.01)
*H04W 68/00* (2009.01)

(52) U.S. Cl.
CPC ......... *H04W 76/064* (2013.01); *H04L 67/303* (2013.01); *H04W 4/008* (2013.01); *H04W 68/005* (2013.01)

(58) Field of Classification Search
None
See application file for complete search history.

(56) References Cited

U.S. PATENT DOCUMENTS

| | | | |
|---|---|---|---|
| 8,787,899 B2* | 7/2014 | Parkkinen | H04L 63/145 370/383 |
| 2014/0105396 A1* | 4/2014 | Engelien-Lopes | H04W 12/04 380/270 |

(Continued)

FOREIGN PATENT DOCUMENTS

JP       2008005060 A      1/2008

OTHER PUBLICATIONS

"Bluetooth Specification Version 4.2", Oct. 2, 2014, XP055281707, Retrieved from the Internet: URL: https://www . bluetooth.org/DocMan/handlers/DownloadDoc.ashx?doc id=286439.

(Continued)

*Primary Examiner* — David Bilodeau
(74) *Attorney, Agent, or Firm* — Holtz, Holtz & Volek PC

(57) ABSTRACT

A wireless communication device includes a wireless communication unit, a storage unit and a processor. The wireless communication unit performs near field communication with another wireless communication device. The storage unit stores an other-device address which is identification information of said another wireless communication device and which is acquired through the wireless communication unit. The processor updates an own-device address which is identification information of the wireless communication device, when receiving an instruction for excluding the other-device address from a connection destination of the near field communication.

18 Claims, 9 Drawing Sheets

(56) References Cited

U.S. PATENT DOCUMENTS

2015/0271629 A1* 9/2015 Knaappila ............. H04W 8/005
  455/41.2
2015/0327001 A1* 11/2015 Kirshenberg ......... H04W 28/18
  455/41.2

OTHER PUBLICATIONS

Partial European Search Report dated Feb. 13, 2017, issued in counterpart European Application No. 16186464.
Townsend, "Getting Started with Bluetooth Low Energy", May 12, 2014, O'Reilly Media, Inc., XP055213341, ISBN: 978-1-49-194951-1, pp. 15-50.
Extended European Search Report (EESR) dated Jul. 7, 2017 issued in counterpart European Application No. 16186464.0.
Taghiloo, et al., "New Approach for Address Auto-Configuration in MANET Based on Virtual Address Space Mapping (VASM)", Information and Communication Technologies: From Theory to Applications, 3rd International Conference on, IEEE, Piscataway, NJ, USA, Apr. 7, 2008, pp. 1-6.
Villalba, et al., "Distributed Dynamic Host Configuration Protocol (D2HCP)", Sensors, vol. 11, No. 12, Dec. 18, 2011, pp. 4438-4461.

* cited by examiner

WIRELESS COMMUNICATION DEVICE, ELECTRONIC TIMEPIECE AND WIRELESS COMMUNICATION METHOD

CROSS-REFERENCE TO RELATED APPLICATIONS

This application is based upon and claims the benefit of priority from the prior Japanese Patent Application Nos. 2015-183892, filed on Sep. 17, 2015, and 2016-103253, filed on May 24, 2016 and the entire contents of which are incorporated herein by reference.

BACKGROUND OF THE INVENTION

Field of the Invention

The present invention relates to a wireless communication device, an electronic timepiece and a wireless communication method.

Description of the Related Art

Recently, wireless communication devices for performing wireless communication based on Bluetooth (a trademark) which is a standard for near field communication have spread.

For example, JP-A-2008-005060 discloses an image data transmission/reception system for performing transmission and reception of image data by near field communication. In this system, a device for transmitting and receiving image data identifies a device which is a transmission source or a transmission destination based on device IDs assigned to devices, respectively. As an ID for a device, a unique serial number (a Bluetooth device address) assigned to the device during manufacturing of the device can be used.

This near field communication is used even between a wireless communication terminal such as a smart phone and an electronic timepiece. Even in this case, a Bluetooth device address (hereinafter, referred to as a "device address" can be used as a device ID. The device ID of the electronic timepiece is generated by encoding a unique serial number assigned to the device during manufacturing of the device.

In this case, a current wireless communication device such as a smart phone or an electronic timepiece performs mutual authentication with a wireless communication device which is first connected thereto. In a case where mutual authentication succeeds, the wireless communication device stores the device ID of the connected wireless communication device in its own storage unit. The process of registering information on a wireless communication device in a case where the wireless communication device is connected in the above described manner is referred to as pairing. Thereafter, when the wireless communication device is connected with a paired wireless communication device, connection is established without processing such as mutual authentication.

As described above, the device address of a wireless communication device for performing near field communication is generated during manufacturing of the device. Thereafter, the device address cannot be changed or updated by a user's operation or the like.

Some of the wireless communication devices for performing near field communication can be paired with only one wireless communication device. As an example of such devices, there is an electronic timepiece pairable with only one smart phone.

In a case of connecting such a wireless communication device to a non-paired different wireless communication device, unless performing an operation for breaking an existing pairing, a user cannot perform an operation on any other wireless communication device. The operation for breaking the pairing is an operation for deleting information device addresses stored in the storage units of the paired wireless communication devices.

For example, in a case where a wireless communication device is an electronic timepiece pairable only with one smart phone, in order to delete an existing pairing, three deleting operations are required. The first deleting operation is an operation for deleting information on the paired smart phone, such as the device address, from the storage unit of the electronic timepiece. The second deleting operation is an operation for deleting information on the electronic timepiece, such as the device address, from the operating system (OS) of the paired smart phone. The third deleting operation is an operation of deleting information on the electronic timepiece, such as the device address, from the application software of the paired smart phone.

Also, even in a case where the electronic time piece is pairable with only one smart phone needs to redo pairing due to a problem attributable to updating of the OS of the smart phone, in order to break the existing pairing, the three deleting operations are required.

As described above, in the configuration of a wireless communication device for performing near field communication according to the related art, in order to break a pairing, operations for deleting information such as device addresses are required. Therefore, convenience for users deteriorates.

SUMMARY OF THE INVENTION

The present invention was made in view of the above described circumstances, and an object of the present invention is to provide a communication device and the like for simplifying an operation for breaking a pairing, thereby improving convenience for users.

According to one aspect of the present invention, a wireless communication device includes a wireless communication unit, a storage unit and a processor. The wireless communication unit performs near field communication with another wireless communication device. The storage unit stores an other-device address which is identification information of said another wireless communication device and which is acquired through the wireless communication unit. The processor updates an own-device address which is identification information of the wireless communication device, when receiving an instruction for excluding the other-device address from a connection destination of the near field communication.

According to another aspect of the present invention, a wireless communication method between one wireless communication device and another wireless communication device, comprising: storing an other-device address which is identification information of said another wireless communication device acquired by near field communication; and updating an own-device address which is identification information of the wireless communication device, when receiving an instruction for excluding the other-device address stored in the storing step, from a connection destination of the near field communication.

According to further another aspect of the present invention, a wireless communication method between one wireless communication device and another wireless communication device, comprising: displaying an other-device address which is identification information of said another wireless communication device; notifying an own-device address which is identification information of the wireless communication device, to said another wireless communication device by near field communication; receiving another other-device address updated by said another wireless communication device, from said another wireless communication device, by the near field communication; and updating the other-device address displayed in the displaying step, with a different value.

DETAILED DESCRIPTION

Hereinafter, embodiments of the present invention will be described with reference to the accompanying drawings.

First Embodiment

Figure 1:
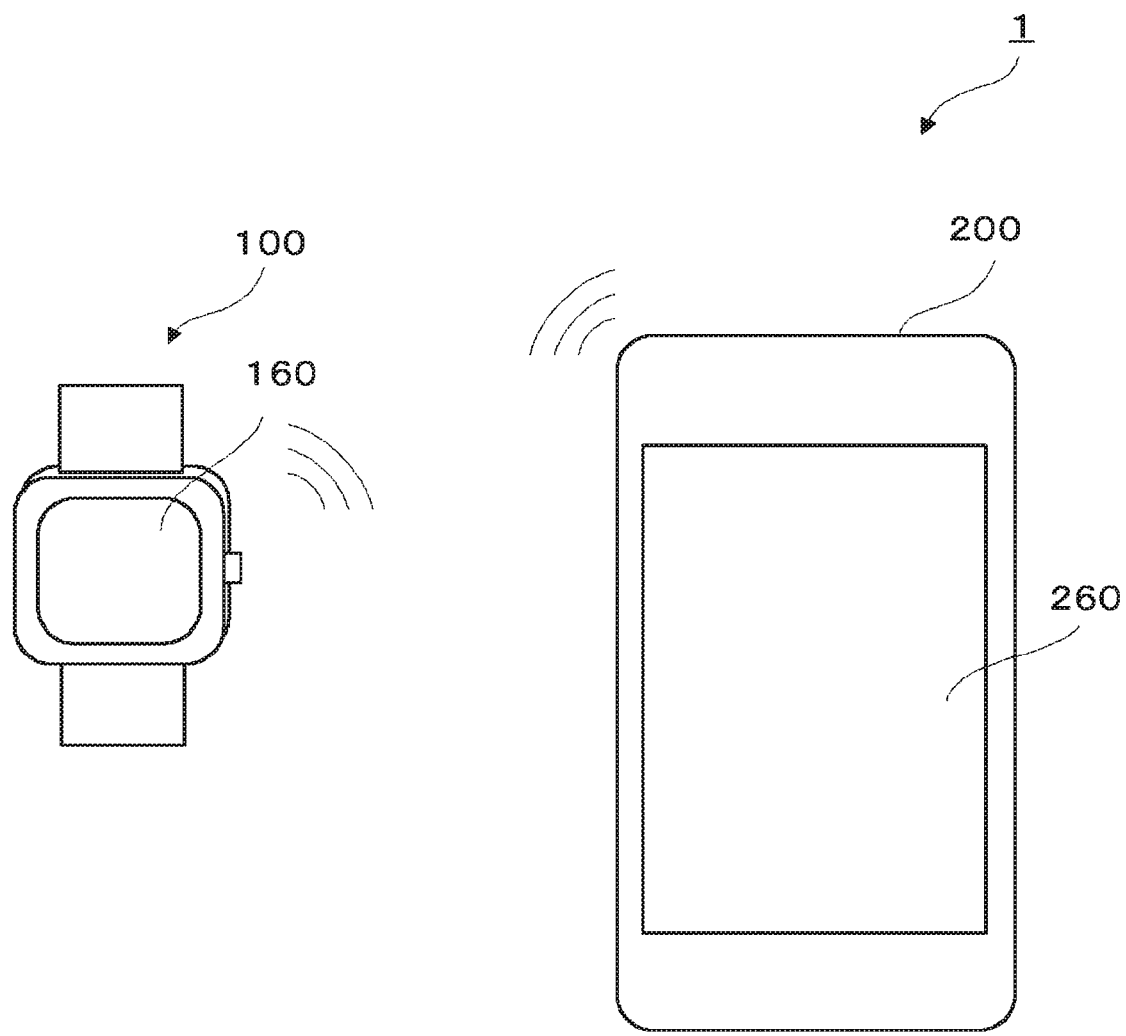
FIG. 1 is a view illustrating a configuration example of a wireless communication system according to a first embodiment.

As shown in FIG. 1, a wireless communication system 1 according to a first embodiment of the present invention is composed of a peripheral 100 which is a wireless communication device, and a central device 200 which is another wireless communication device different from the peripheral 100.

The peripheral 100 and the central device 200 perform wireless communication with each other, based on Bluetooth (a trademark) low energy (hereinafter, referred to as BLE). BLE is a standard (mode) set for low power consumption in the near field communication standard called Bluetooth (a trademark).

In this configuration, the peripheral 100 provides a service to the central device 200. The central device 200 uses the service provided from the peripheral 100.

The peripheral 100 and the central device 200 are portable terminals having a wireless communication function based on BLE, such as a tablet type personal computer, a laptop, and a timepiece.

In the present embodiment, as an example, it is assumed that the peripheral 100 is an electronic timepiece, and the central device 200 is a wireless communication terminal configured to receive a variety of data from the peripheral 100 and display the data on a display unit 260.

Figure 2:
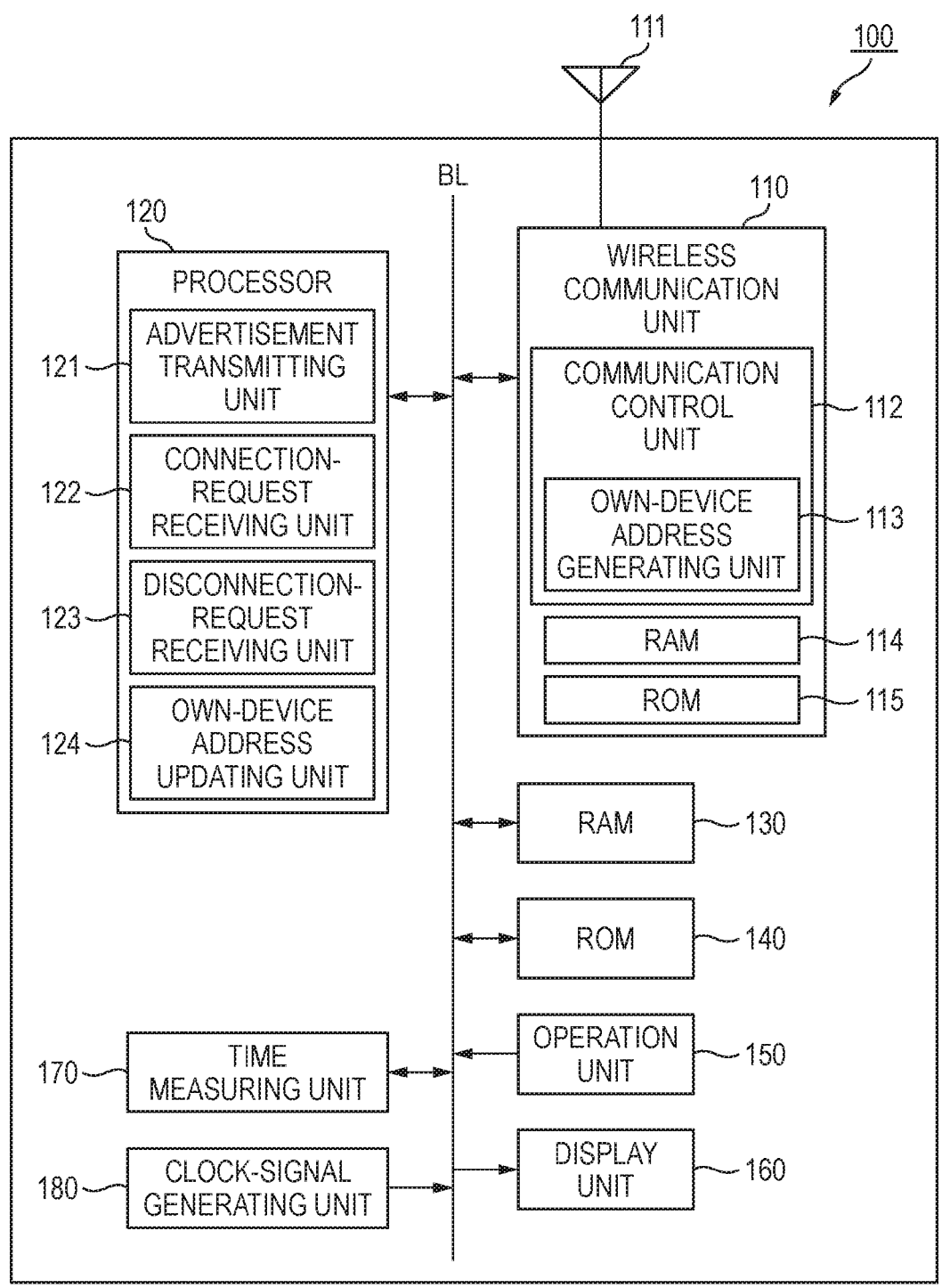
FIG. 2 is a block diagram illustrating a configuration example of a peripheral according to the first embodiment.

Hereinafter, the configuration of the peripheral 100 according to the present embodiment will be described. As shown in FIG. 2, the peripheral 100 includes a wireless communication unit 110, a processor 120, a random access memory (RAM) 130, a read only memory (ROM) 140, an operation unit 150, a display unit 160, a time measuring unit 170, and a clock-signal generating unit 180, which are connected by bus lines BL.

The wireless communication unit 110 is composed of components such as a radio frequency (RF) circuit, a base band (BB) circuit, and a large scale integrated (LSI) circuit. The wireless communication unit 110 performs wireless communication based on BLE, with the central device 200 which is a different wireless communication device, by transmitting and receiving signals through an antenna 111.

The processor 120 consists of, for example, a central processing unit (CPU). The processor 120 controls the operation of the whole of the peripheral 100 by executing various programs (such as a program for implementing a control process to be described below) stored in the ROM 140.

The RAM 130 is composed of a volatile memory, and can be used as a work area for temporarily storing data when the processor 120 performs various processes.

The ROM 140 is composed of a non-volatile memory such as a flash memory, and retains programs and a variety of data necessary for the processor 120 to control various functions.

The operation unit 150 is composed of components such as operation buttons and a touch panel, and is an interface which a user can use to input instructions.

The display unit 160 consists of, for example, a liquid crystal display (LCD) or an EL (electroluminescence) display, and displays images according to image data input from the processor 120.

The time measuring unit 170 is composed of a counter circuit for counting the number of pulses of a closed state of the peripheral (own device) 100. Based on the number of pulses which is counted, the time measuring unit 170 measures time. Also, the processor 120 performs a variety of control at timings based on the number of pulses which is counted by the time measuring unit 170.

The clock-signal generating unit 180 is composed of a crystal oscillator configured to generate a reference clock, a variable phase-locked loop (PLL) configured to generate a clock signal with a desired frequency based on the reference crank position, and so on, and generates a clock signal for the peripheral (own device) 100. This color-difference signal has a frequency which is controlled by changing the frequency division ratio of the variable PLL.

Now, the functional configurations of the wireless communication unit 110 and the processor 120 of the peripheral 100 will be described.

The wireless communication unit 110 includes a communication control unit 112, a RAM 114, and a ROM 115. The communication control unit 112 consists of, for example, a CPU. The communication control unit 112 controls the operation of the whole of the wireless communication unit 110 by executing various programs (such as a program for implementing a control process to be described below)

stored in the ROM 115. Also, the communication control unit 112 functions as an own-device address generating unit 113

In the following description, the identification information (device address) of the own device will be referred to as the "own-device address", and the identification information (device address) of the other wireless communication device will be referred to as the "other-device address". Also, whether a device is the "own device" or the "other device" is determined from the angle of the corresponding device. For example, the device address of the peripheral is the own-device address from the angle of the peripheral 100; however, it is the other-device address from the angle of the central device 200.

In the RAM 114 of the wireless communication unit 110, the own-device address is stored. In the ROM 115 of the wireless communication unit 110, basic data necessary to generate the own-device address is stored. In this configuration, the own-device address which is stored in the RAM 114 is appropriately updated by an own-device address updating unit 124 (to be described below). Meanwhile, the basic data is stored in the ROM 115 during manufacturing, and then is maintained without being updated by a user's operation.

The own-device address generating unit 113 of the communication control unit 112 generates the own-device address by reading the basic data out from the ROM 115 and encoding the basic data. The encoding of the basic data is performed based on random numbers generated by a hash function.

The processor 120 functions as an advertisement transmitting unit 121, a connection-request receiving unit 122, a disconnection-request receiving unit 123, and the own-device address updating unit 124.

The advertisement transmitting unit 121 transmits an advertisement to the central device 200 through the wireless communication unit 110 and the antenna 111. The transmission of the advertisement is performed, at regular intervals according to processing of a program, or in response to a user's operation. Also, the advertisement is notification information for notifying that the own device exist. Further, the advertisement is information including the own-device address.

The connection-request receiving unit 122 receives a connection request from the central device 200 through the antenna 111 and the wireless communication unit 110, and establishes a connection with the central device 200. The establishment of the connection makes data communication with the central device 200 possible.

The disconnection-request receiving unit 123 receives a disconnection request for interrupting the connection, from the central device 200, through the antenna 111 and the wireless communication unit 110, and interrupts the connection with the central device 200.

The own-device address updating unit 124 performs an own-device address updating process, thereby updating the own-device address. The own-device address updating process will be described below.

Until now, the configuration of the peripheral 100 according to the present embodiment has been described. Now, the configuration of the central device 200 according to the present embodiment will be described.

Figure 3:
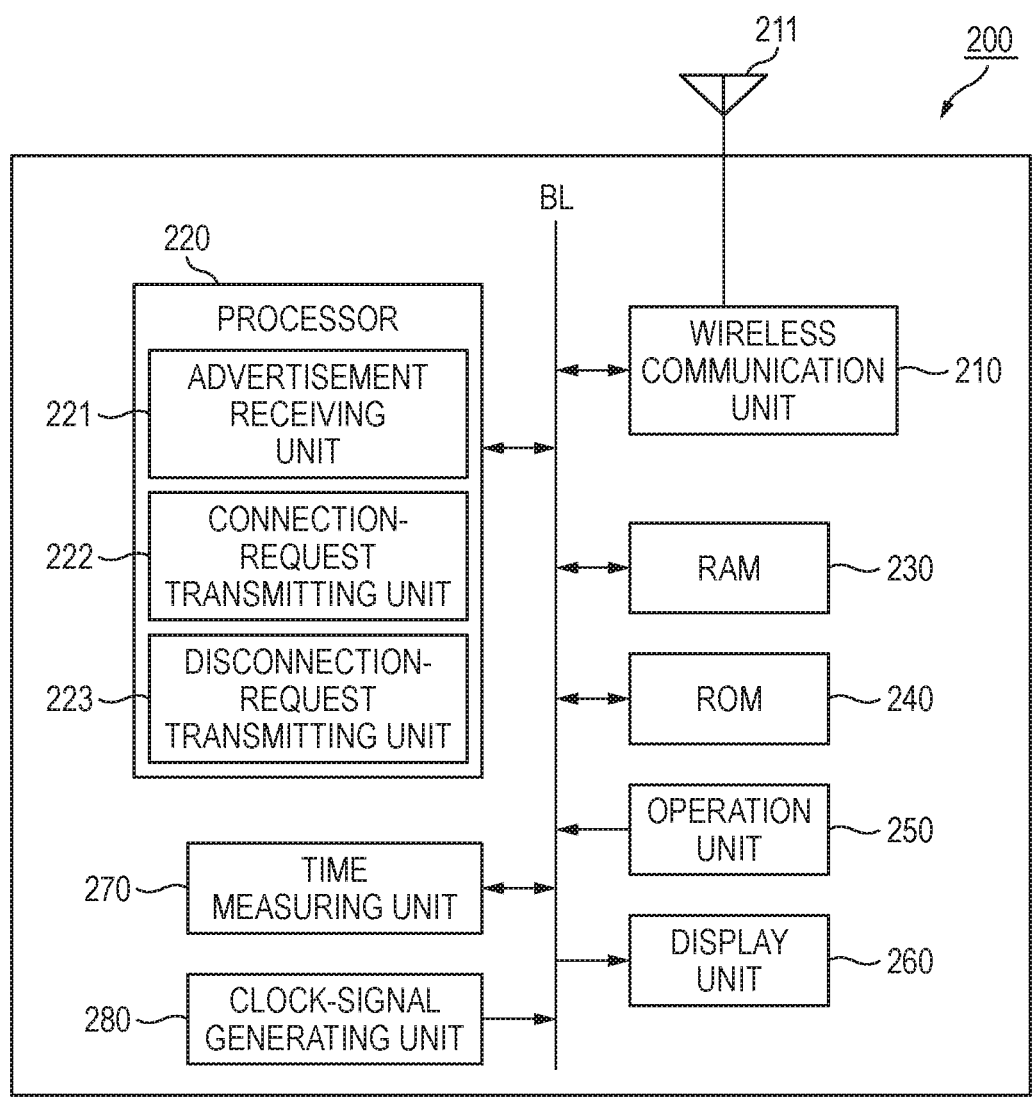
FIG. 3 is a block diagram illustrating a central device according to the first embodiment.

As shown in FIG. 3, the central device 200 includes a wireless communication unit 210, a processor 220, a RAM 230, a ROM 240, an operation unit 250, a display unit 260, a time measuring unit 270, and a clock-signal generating unit 280, which are connected by bus lines BL.

The wireless communication unit 210 is composed of components such as an RF circuit, a BB circuit, and an LSI circuit. The wireless communication unit 210 performs wireless communication based on BLE, with the peripheral 100 which is another wireless communication device, through an antenna 211. Also, for the wireless communication unit 210, the own-device address is set during manufacturing. This own-device address is not updated by a user's operation.

The processor 220 consists of, for example, a CPU. The processor 220 controls the operation of the whole of the central device 200 by executing various programs (such as a program for implementing a control process to be described below) stored in the ROM 240.

The RAM 230 is composed of a volatile memory, and can be used as a work area for temporarily storing data when the processor 220 performs various processes.

The ROM 240 is composed of a non-volatile memory such as a flash memory, and retains programs and data necessary for the processor 220 to control various functions.

The operation unit 250 is composed of components such as a touch panel, and is an interface for receiving user's operations.

The display unit 260 consists of, for example, an LED or an EL device, and displays images according to image data input from the processor 220.

The time measuring unit 270 is composed of a counter circuit for counting the number of pulses of a closed state of the central device (own device) 200. Based on the number of pulses which is counted, the time measuring unit 270 measures time. Also, the processor 220 performs a variety of control at timings based on the number of pulses which is counted by the time measuring unit 270.

The clock-signal generating unit 280 is composed of a crystal oscillator configured to generate a reference clock, a variable PLL configured to generate a clock signal with a desired frequency based on the reference crank position, and so on, and generates a clock signal for the central device (own device) 200. This color-difference signal has a frequency which is controlled by changing the frequency division ratio of the variable PLL.

Now, the functional configurations of the processor 220 of the central device 200 will be described. The processor 220 functions as an advertisement receiving unit 221, a connection-request transmitting unit 222, and a disconnection-request transmitting unit 223.

Based on a scan instruction, the advertisement receiving unit 221 receives the advertisement from the peripheral 100 through the antenna 211 and the wireless communication unit 210. As a result, the central device 200 recognizes that the peripheral 100 exists. As a user's operation for issuing the scan instruction, for example, activation of an application for using the service of the peripheral 100 can be considered. Also, the scan instruction is not limited to a user's operation, and may also be performed at regular intervals after activation of the application.

The connection-request transmitting unit 222 transmits a connection request for requesting a connection, to the peripheral 100, through the wireless communication unit 210 and the antenna 211. After receiving the advertisement from the peripheral 100, when a connection is required, the connection request can be transmitted. Also, the connection request includes the own-device address (the device address of the central device 200).

When the central device is connected to the peripheral 100, in order to interrupt the connection, the disconnection-request transmitting unit 223 transmits the disconnection request to the peripheral through the wireless communication unit 210. For example, in a case where data communication with the connected peripheral 100 has finished, or in a case where the user has performed a disconnection operation, the disconnection request can be transmitted.

Now, the own-device address updating process of the peripheral 100 will be described with reference to FIG. 4. This process is mainly performed in the own-device address updating unit 124 of the processor 120. This process is performed if the other-device address (for example, the device address of the central device 200) is deleted from the RAM 114 of the wireless communication unit 110 of the peripheral 100.

First, in STEP S101, the own-device address updating unit 124 of the processor 120 controls the own-device address generating unit 113 of the wireless communication unit 110 such that the own-device address generating unit generates the own-device address. The own-device address can be generated by the above described method.

Subsequently, in STEP 5102, the own-device address updating unit 124 of the processor 120 performs updating with the generated own-device address. In this specification, the term "updating" means an operation of rewriting some of data (that is, the device address).

Now, the device address which is updated will be described. As shown in FIG. 5, the device address is composed of six octets 0 to 5. One octet is composed of two hexadecimal digits. In the individual octets, "0x" means that the corresponding octets are hexadecimal values. These hexadecimal values are random values which are set for each wireless communication device (each device). Also, MSB (Most Significant Bit) represents that a corresponding bit is the most significant bit, and LSB (Least Significant Bit) represents that a corresponding bit is the least significant bit.

In BLE, there are four usable address types of an RPA (resolvable private address) type, an NRPA (non-resolvable private address) type, a random static type, and a public address type.

The address type of a device address is determined by the most significant 2 bits of the device address. The device addresses which are used in the present embodiment are the random static type.

Figures 4, 5:
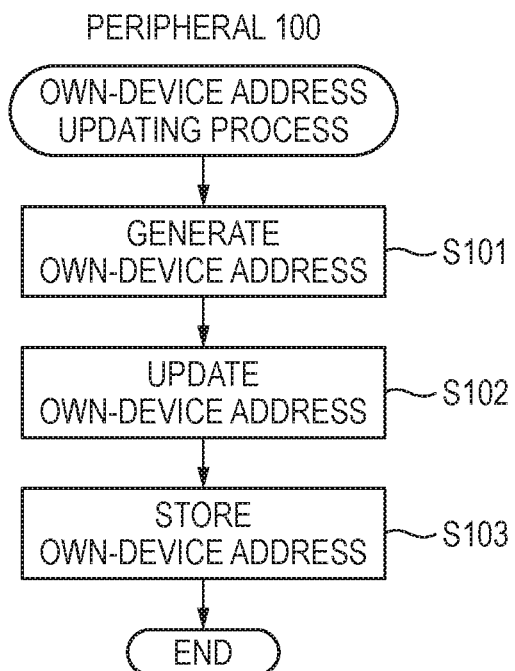
FIG. 4 is a flow chart illustrating an example of a device-address addressing process according to the first embodiment.
FIG. 5 is a view illustrating an example of a device address which is updated.

In the present embodiment, in the device address shown in FIG. 5, in the "○" portion of two hexadecimal digits of the octet 5, any one value of C, D, E, and F is used such that it is possible to identify that the address type of the device address is the random static type. In other words, in each portion shown by "X" in FIG. 5, any one of hexadecimal digits 1 to F can b used; whereas in the portion shown by "○", only one of hexadecimal digits C to F can be used.

When the device address is updated, two octets of the octet 0 and the octet 1, and the "○" portion of the octet 5 are rewritten. The values of the other portions are kept.

The value of the octet 0 is rewritten with a value representing the second(s) of the current time during updating, that is, one of 0x00 to 0x59. The own-device address updating unit 124 reads out the value representing the second(s) of the current time from the time measuring unit 170, and two digits of the octet 0 with the read value.

The value of the octet 1 is rewritten with the count value during updating, that is, any one of 0x00 to 0xFF. The own-device address updating unit 124 reads out the count value from a low-speed time base register circuit of the clock-signal generating unit 180, and rewrites two digits of the octet 1 with the read value. The count value is a value which is counted up by an 8-bit counter (a clock having a frequency in the range between 1 Hz to 128 Hz) of the low-speed time base register circuit.

The "○" portion of the octet 5 is rewritten with a value based on the second(s) of the current time during updating. The own-device address updating unit 124 reads out the value representing the second(s) of the current time from the time measuring unit 170, and rewrites the value of the "○" portion of the octet 5 with "C" in a case where the read value is between 1 to 14, with "D" in a case where the read value is between 15 and 29, with "E" in a case where the read value is between 30 and 44, and with "F" in a case where the read value is between 45 and 59.

By the method described above, the own-device address is updated. Thereafter, as shown in FIG. 4, in STEP S103, the own-device address updating unit 124 of the processor 120 stores the updated own-device address in the RAM 130 and the RAM 114 of the wireless communication unit 110.

Also, the own-device address updating process described above is a device-address updating process which is performed during a normal state (in a case where the power of the wireless communication unit 110 is in an ON state). In contrast with this, during a special state (in a case where the power of the wireless communication unit 110 is in an OFF state), the own-device address updating unit 124 performs a device-address updating process different from the own-device address updating process during the normal state.

In the own-device address updating process which is performed during the normal state, the wireless communication unit 110 is used to update the own-device address. In contrast with this, during the special state, since the power of the wireless communication unit 110 is in the OFF state, in order to use the wireless communication unit 110 to update the own-device address, it is required to turn on the power of the wireless communication unit 110. However, in a case of deleting the other-device address from the peripheral 100 (for example, pulling of the crown of the electronic timepiece), and turning on the power of the wireless communication unit 110, and updating the own-device address, since processing is complicated, it is feared that a problem may occur.

For this reason, during the special state, in order to make it possible to update the own-device address while maintaining the power of the wireless communication unit 110 in the OFF state, an own-device address updating process which does not use the wireless communication unit 110 is used. Specifically, in the own-device address updating process which is performed during the normal state, the process of STEP S101 using the wireless communication unit 110 to generate the own-device address is omitted. Instead of that, the own-device address updating unit 124 reads out the existing own-device address from the RAM 130, and updates the own-device address.

In the own-device address updating process during the special state, two octets of the octet 2 and the octet 3, and the "○" portion of the octet 5 are rewritten. The values of the other portions are kept. In other words, the case of the special state is different from the case of the normal state in the portions which are rewritten.

The device address rewriting method during the special state is almost the same as that during the normal state. The value of the octet 2 is rewritten with a value representing the second(s) of the current time during updating, that is, one of 0x00 to 0x59. The own-device address updating unit 124 reads out the value representing the second(s) of the current time from the time measuring unit 170, and two digits of the octet 2 with the read value.

The value of the octet 3 is rewritten with the count value during updating, that is, any one of 0x00 to 0xFF. The own-device address updating unit 124 reads out the count value from a low-speed time base register circuit of the clock-signal generating unit 180, and rewrites two digits of the octet 3 with the read value.

In the case of the special state, after the own-device address is updated as described above, the own-device address updating unit 124 of the processor 120 stores the updated own-device address in the RAM 130. Also, the own-device address updating unit stores the updated own-device address even in the RAM 114 of the wireless communication unit 110 if the power of the wireless communication unit 110 is turned on.

Now, a pairing-operation process which is performed by the peripheral 100 and the central device 200 in a case of using the own-device address updating process described above will be described. The pairing-operation process is performed, for example, if the user performs a software activation operation on the peripheral 100 or the central device 200. Also, it is assumed that, during start of the pairing-operation process, the peripheral 100 and the central device 200 are not yet paired.

Figure 6:
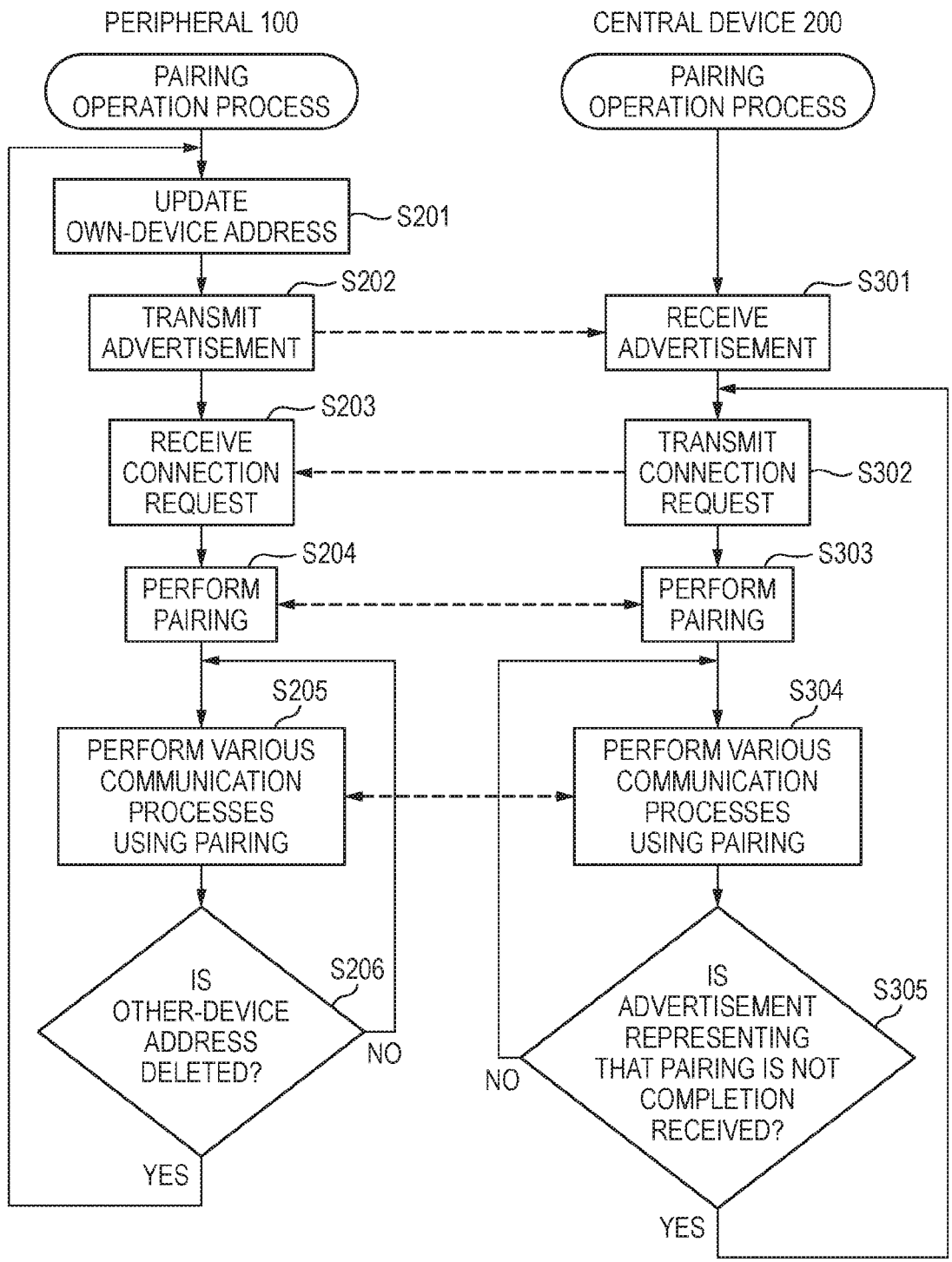
FIG. 6 is a flow chart illustrating an example of a pairing-operation process which is performed by the peripheral and the central device according to the first embodiment.

If the pairing-operation process starts, as shown in FIG. 6, first, in STEP S201, the processor 120 of the peripheral 100 performs the own-device address updating process. This updating process is performed by the own-device address updating unit 124, and corresponds to STEPS S101 to 103 of FIG. 4 described above. However, in the case of the special state different from the normal state, the other updating process described above is used.

Subsequently, in STEP S202, the processor 120 of the peripheral 100 transmits the advertisement to the central device 200. This process is performed by the advertisement transmitting unit 121. Also, the advertisement includes the updated own-device address (the device address of the peripheral 100).

Then, in STEP S301, the processor 220 of the central device 200 receives the advertisement through the wireless communication unit 210. The advertisement receiving unit 221 scans cannels of a frequency band in which the advertisement can be transmitted, whereby the advertisement is received.

Subsequently, in STEP S302, the processor 220 of the central device 200 transmits the connection request to the peripheral 100 through the wireless communication unit 210. This process is performed by the connection-request transmitting unit 222. Also, the connection request includes the own-device address (the device address of the central device 200).

Then, in STEP S203, the processor 120 of the peripheral 100 receives the connection request through the wireless communication unit 110. The connection request is received by the connection-request receiving unit 122. If receiving the connection request, the connection-request receiving unit 122 establishes a connection with the central device 200.

If a connection between the peripheral 100 and the central device 200 is established as described above, the peripheral 100 and the central device 200 individually perform pairing in STEP S204 and STEP S303, respectively. Specifically, the processor 120 of the peripheral 100 stores the other-device address (the device address of the central device 200) included in the received connection request, in the RAM 114 of the wireless communication unit 110 and the RAM 130. The processor 220 of the central device 200 stores the other-device address (the device address of the peripheral 100) included in the received advertisement, in the wireless communication unit 210 and the RAM 230.

If pairing finishes, between the peripheral 100 and the central device 200, various communication processes using the pairing are performed (STEP S205 and STEP S304). Here, various communication processes using the pairing are processes which are performed by user's operations and the like, such as data communication, interruption of the connection, and reconnection.

Interruption of the connection is performed if the peripheral 100 receives the disconnection request from the central device 200. The transmission and reception of the disconnection request are performed by the disconnection-request receiving unit 123 of the peripheral 100 and the disconnection-request transmitting unit 223 of the central device 200.

After interruption of the connection, reconnection is performed by transmission and reception of the advertisement and transmission and reception of the connection request described above. However, during reconnection, pairing and the own-device address updating process are not required. Also, in a case where the other-device address (the device address of the central device 200) is deleted from the RAM 114 or the RAM 130 of the peripheral 100 even though any communication process using the pairing has not been performed, STEP S205 and STEP S304 described above are skipped.

In this pairing-operation process, the processor 120 of the peripheral 100 regularly performs STEP S206 of determining whether the other-device address has been deleted from the RAM 114 or the RAM 130 of the peripheral 100. In a case where it is determined that the other-device address has not been deleted ("No" in STEP S206), the processor 120 of the peripheral 100 continues various computer programs using the pairing. Meanwhile, in a case where it is determined that the other-device address has been deleted ("Yes" in STEP S206), the processor 120 of the peripheral 100 returns to STEP S201, and re-performs processing such as the own-device address updating process.

Meanwhile, if the central device 200 receives the advertisement from the peripheral 100, in STEP S305, the processor 220 determines whether the received advertisement represents that pairing has been completed.

As described above, after the peripheral 100 deletes the other-device address ("Yes" in STEP S206), and the own-device address updating process of STEP S201 is performed, if an advertisement is received, the advertisement includes a device address different from the original device address of the peripheral 100. In this case, the processor 220 of the central device 200 determines that the received advertisement represents that pairing has not been completed. Then, the processor returns to STEP S302 in which the processor transmits the connection request again. Subsequently, in STEP S303, the processor performs pairing.

Also, in the flow chart of FIG. 6, that second pairing is performed with respect to the central device 200, similarly in the first pairing. However, the second pairing can be performed with a central device (not shown) different from the central device 200. For example, in a case where there is a problem, for example, in updating the OS of the central device 200, the user may try to pair the peripheral 100 with the central device 200 again. In this case, the second pairing also is performed with respect to the central device 200, similarly in the first pairing. Meanwhile, in a case where the user wants to pair the peripheral with another central device (not shown), the user tries to pair the peripheral with the corresponding central device.

Also, unless the peripheral 100 deletes the other-device address ("No" in STEP S206), the own-device address updating process of STEP S201 is not performed. For this reason, in an advertisement which is transmitted thereafter, as the device address of the peripheral 100, the same address as that in the first pairing is included. In this case, the processor 220 of the central device 200 determines that the received advertisement represents that pairing has been completed ("No" in STEP S305), and continues various computer programs using the pairing in STEP S304.

As described above, if the processor 120 deletes the other-device address from the RAM 114 or the RAM 130, the peripheral 100 updates the own-device address. Thereafter, the peripheral 100 includes the updated own-device address in an advertisement to be transmitted to the central device 200. In this case, even though not deleting the original own-device address of the peripheral 100 from the RAM 230 and the like of the central device 200, the peripheral 100 can perform pairing with the central device 200, using the updated own-device address.

As described above, according to the wireless communication system 1 of the present embodiment, in order to beak the pairing between the peripheral 100 and the central device 200, only the operation of deleting the other-device address from the peripheral 100 is required. Therefore, it is possible to simplify the operation for breaking the pairing between the peripheral 100 and the central device 200, thereby improving convenience for users.

In the own-device address updating process of the peripheral 100, the time measured by the time measuring unit 170 and the count value of the clock-signal generating unit 180 are used. Therefore, the processor 120 of the peripheral 100 can rewrite the own-device address with a value according to the timing of updating.

In the own-device address updating process of the peripheral 100, the different updating processes are performed based on the normal state and the special state. Thereafter, not only in the case where the power of the wireless communication unit 110 is in the ON state, but also in the case where the power of the wireless communication unit 110 is in the OFF state, the peripheral 100 can perform the updating process without any problem.

Second Embodiment

In the present embodiment, an example in which the peripheral updates the own-device address by a method different from that of the first embodiment will be described. Hereinafter, a second embodiment of the present invention will be described with some drawings.

In the present embodiment, components identical to those of the first embodiment are denoted by the same reference symbols. Also, components of the present embodiment can be arbitrarily combined with the components of the first embodiment unless otherwise mentioned.

Figure 7:
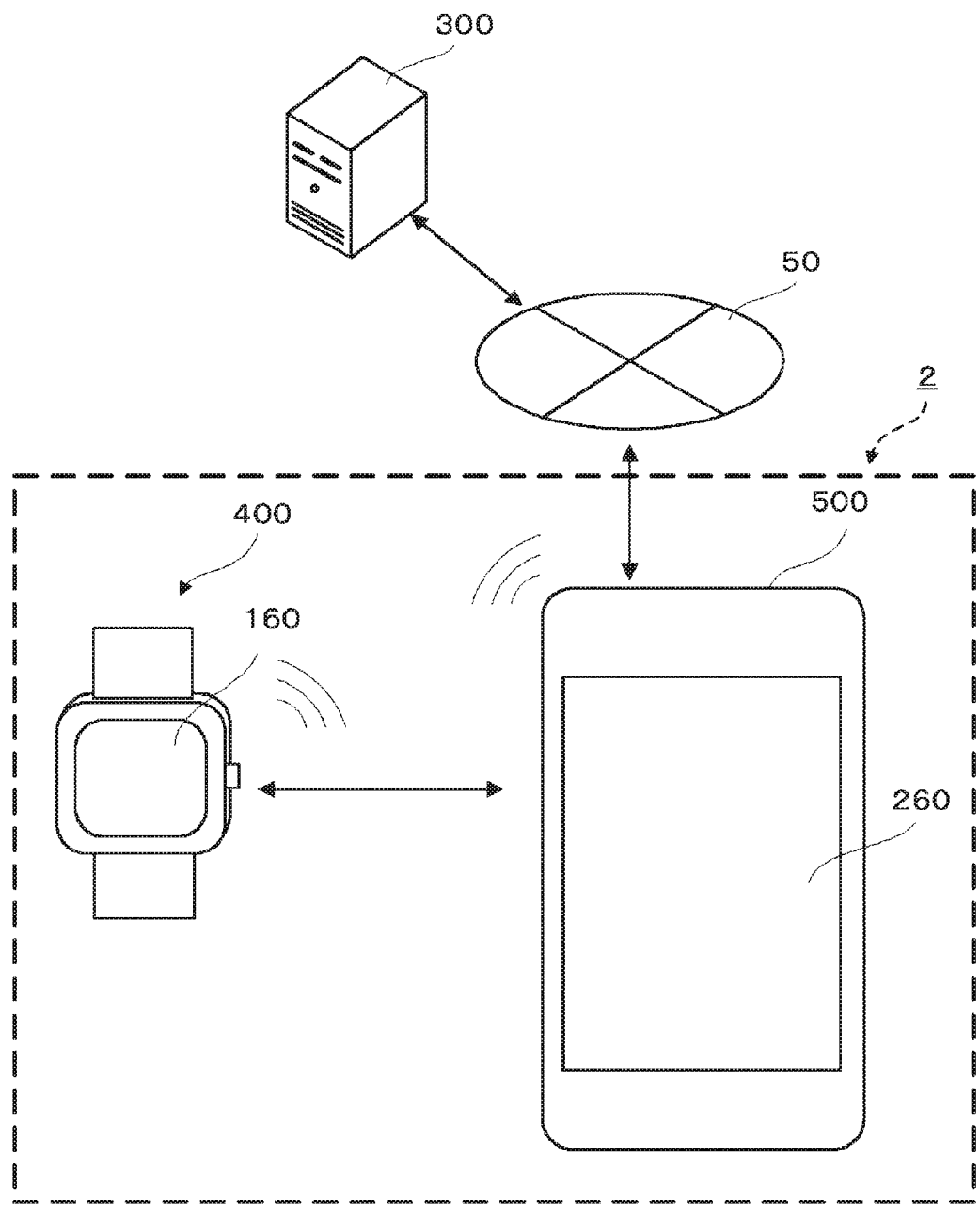
FIG. 7 is a view illustrating a configuration example of a wireless communication system according to a second embodiment.

As shown in FIG. 7, a wireless communication system 2 according to the present embodiment is composed of a peripheral 400 which is a wireless communication device, and a central device 500 which is another wireless communication device different from the peripheral 400.

The peripheral 400 and the central device 200 perform wireless communication with each other, based on BLE. The central device 500 performs communication with a server 300 which manages the device address of the peripheral 400, through a network 50. The network 50 may be a wide area network (WAN), or may be a local area network (LAN).

The peripheral 400 and the central device 500 are configured by the same software as that of the peripheral 100 and the central device 200 according to the first embodiment; however, they have different function configurations. Hereinafter, the detailed configurations of the peripheral 400 and the central device 500 will be described.

Figure 8:
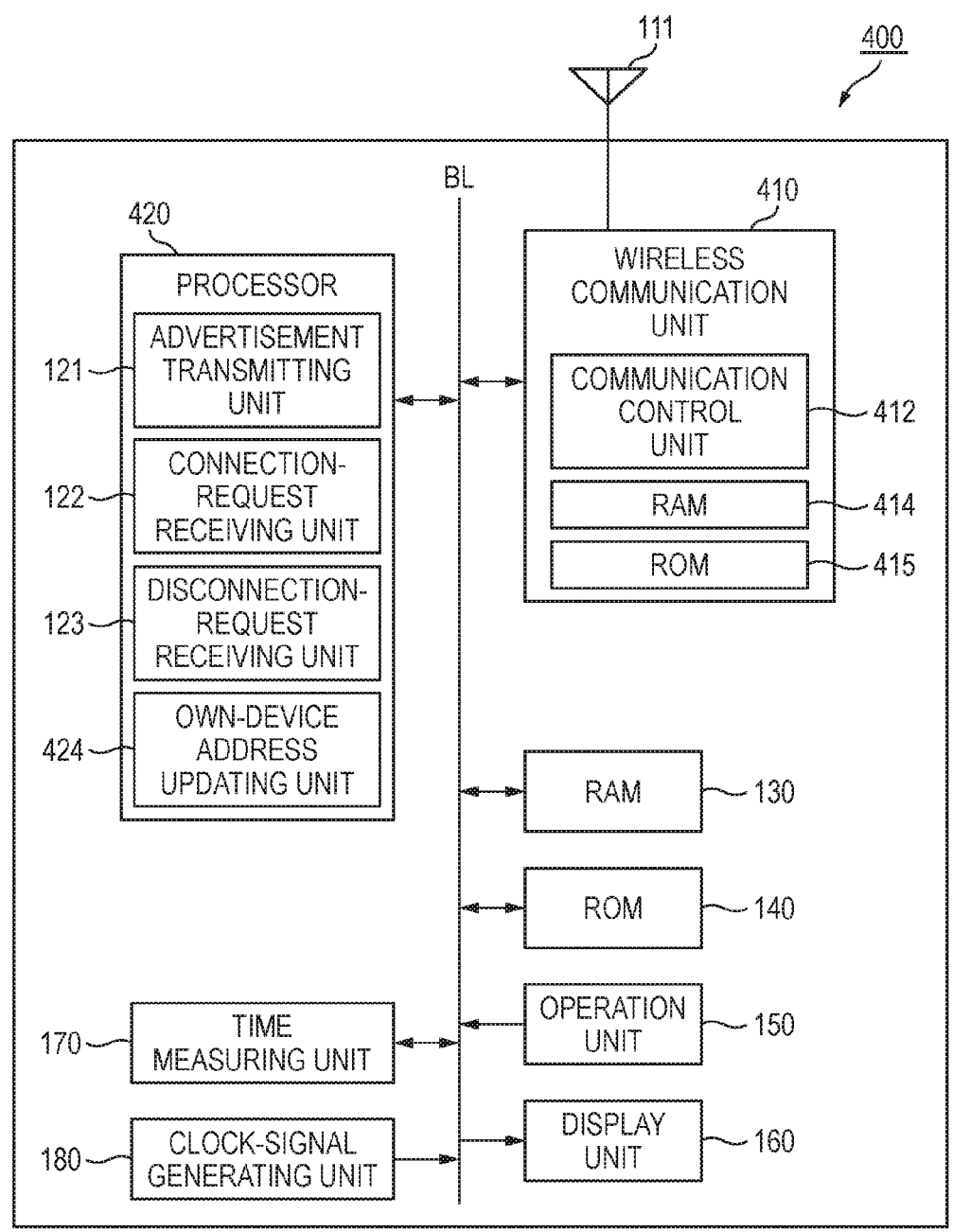
FIG. 8 is a block diagram illustrating a configuration example of a peripheral according to the second embodiment.

As shown in FIG. 8, the peripheral 400 includes a wireless communication unit 410 and a processor 420, in place of the wireless communication unit 110 and the processor 120 of the peripheral 100 according to the first embodiment.

The wireless communication unit 410 is composed of components such as an RF circuit, a BB circuit, and an LSI circuit. The wireless communication unit 410 performs wireless communication based on BLE, with the central device 500 which is a different wireless communication device, by transmitting and receiving signals through the antenna 111.

The processor 420 consists of, for example, a CPU. The processor 420 controls the operation of the whole of the peripheral 400 by executing various programs (such as a program for implementing a control process to be described below) stored in the ROM 140.

Now, the functional configurations of the wireless communication unit 410 and the processor 420 of the peripheral 400 will be described.

The wireless communication unit 410 includes a communication control unit 412, a RAM 414, and a ROM 415. The communication control unit 412 consists of, for example, a CPU. The communication control unit 412 controls the operation of the whole of the wireless communication unit 410 by executing various programs (such as a program for implementing a control process to be described below) stored in the ROM 415. However, the communication control unit 412 does not include the own-device address generating unit 113 unlike the communication control unit 112 of the peripheral 100 according to the first embodiment.

In the RAM 414 of the wireless communication unit 410, the own-device address is stored. In the ROM 415 of the wireless communication unit 410, the initial value of the own-device address is stored.

In this configuration, the own-device address which is stored in the RAM 414 is appropriately updated by an own-device address updating unit 424 (to be described below). Meanwhile, the initial value of the own-device address is stored in the ROM 415 during manufacturing, and then is maintained without being updated by a user's operation.

Also, in the present embodiment, similarly in the first embodiment, it is assumed that the random static type is used as the address type of device addresses. Further, in the present embodiment, it is assumed that 0xD1D1D1D1D1D1 has been set as the initial value of the own-device address. However, the initial value of the own-device address may be any one of values "0xC00000000000" to "0xFFFFFFFFFFFF".

The processor 420 functions as the advertisement transmitting unit 121, the connection-request receiving unit 122, the disconnection-request receiving unit 123, and the own-device address updating unit 424.

The own-device address updating unit 424 updates the own-device address in a manner different from that of the own-device address updating unit 124 according to the first embodiment, by performing an own-device address updating process. This own-device address updating process will be described below.

Until now, the configuration of the peripheral 400 according to the present embodiment has been described. Now, the configuration of the central device 500 according to the present embodiment will be described.

Figure 9:
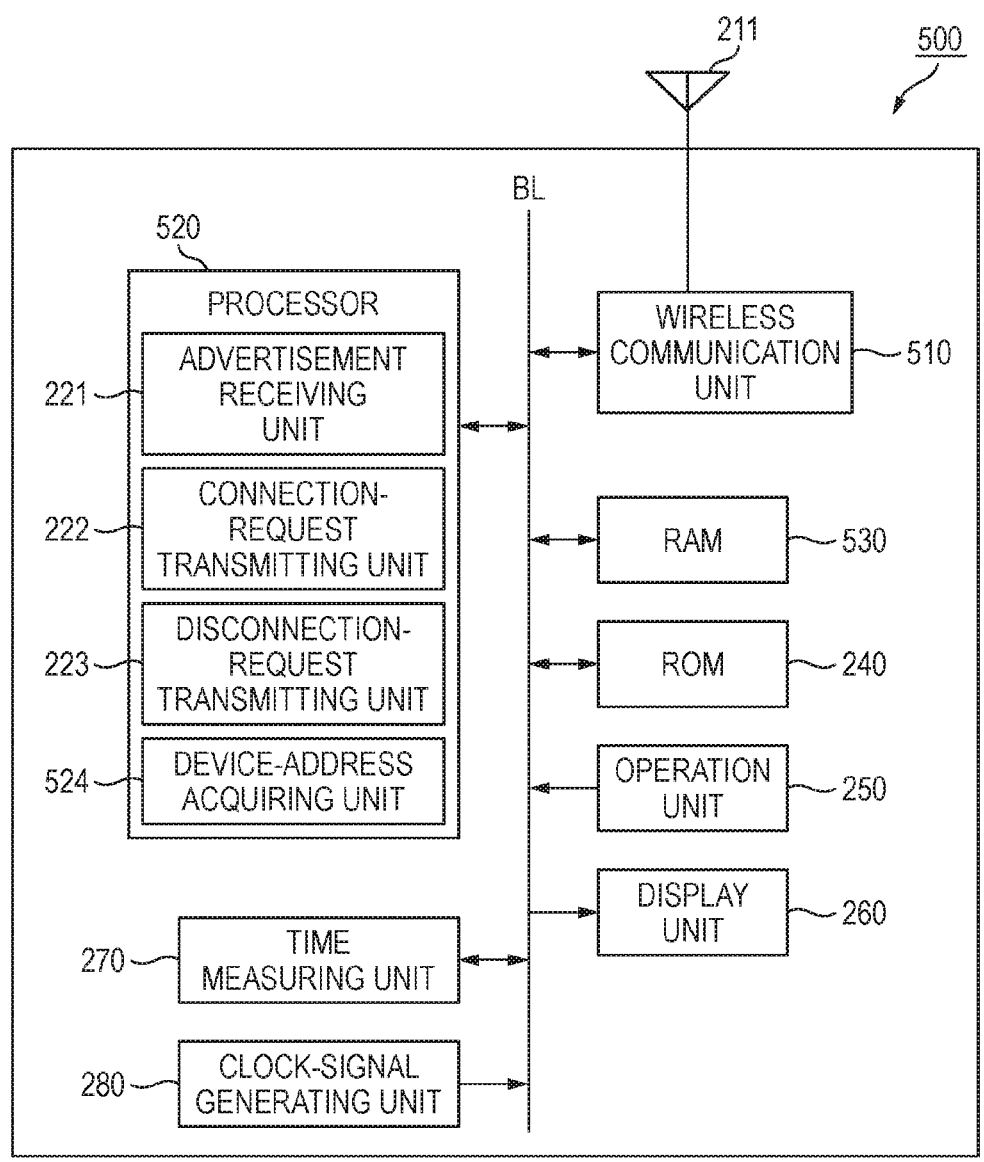
FIG. 9 is a block diagram illustrating a configuration example of a central device according to the second embodiment.

As shown in FIG. 9, the central device 500 includes a wireless communication unit 510, a processor 520, and a RAM 530, in place of the wireless communication unit 210, the processor 220, and the RAM 230 of the central device 200 according to the first embodiment.

The wireless communication unit 510 is composed of components such as an RF circuit, a BB circuit, and an LSI circuit. The wireless communication unit 510 performs wireless communication based on BLE, with the peripheral 400 which is another wireless communication device, through an antenna 211.

Also, the wireless communication unit 510 performs wireless communication with any other device such as a relay device or an access point, through the antenna 211. The wireless communication unit 510 is connected to the network 50 through a relay device, an access point, or the like, thereby performing communication with the server 300. Also, for the wireless communication unit 510, the own-device address is set during manufacturing. This own-device address is not updated by a user's operation.

The processor 520 consists of, for example, a CPU. The processor 520 controls the operation of the whole of the central device 500 by executing various programs (such as a program for implementing a control process to be described below) stored in the ROM 240.

The RAM 530 is composed of a volatile memory, and can be used as a work area for temporarily storing data when the processor 520 performs various processes. However, the RAM 530 is different from the RAM 230 in that the initial value of the device address of the peripheral 400 is stored therein.

The initial value of the device address is stored during manufacturing or shipping of the central device 500, in advance, such that in a case where the central device 500 receives an advertisement from the other device, and the received advertisement includes the corresponding device address, the central device can recognize the corresponding device address as the initial value of the device address. In other words, in the RAM 530 of the central device 500, the initial value of the device address of the peripheral 400 is retained from when the central device has not been paired with the peripheral 400 yet.

Now, the functional configurations of the processor 520 of the central device 500 will be described. The processor 520 functions as the advertisement receiving unit 221, the connection-request transmitting unit 222, and the disconnection-request transmitting unit 223, like the processor 220 according to the first embodiment, and also functions as a device-address acquiring unit 525.

The device-address acquiring unit 525 controls the wireless communication unit 510 such that the wireless communication unit receives a device address from the server 300, thereby acquiring the device address from the server 300.

Figure 10:
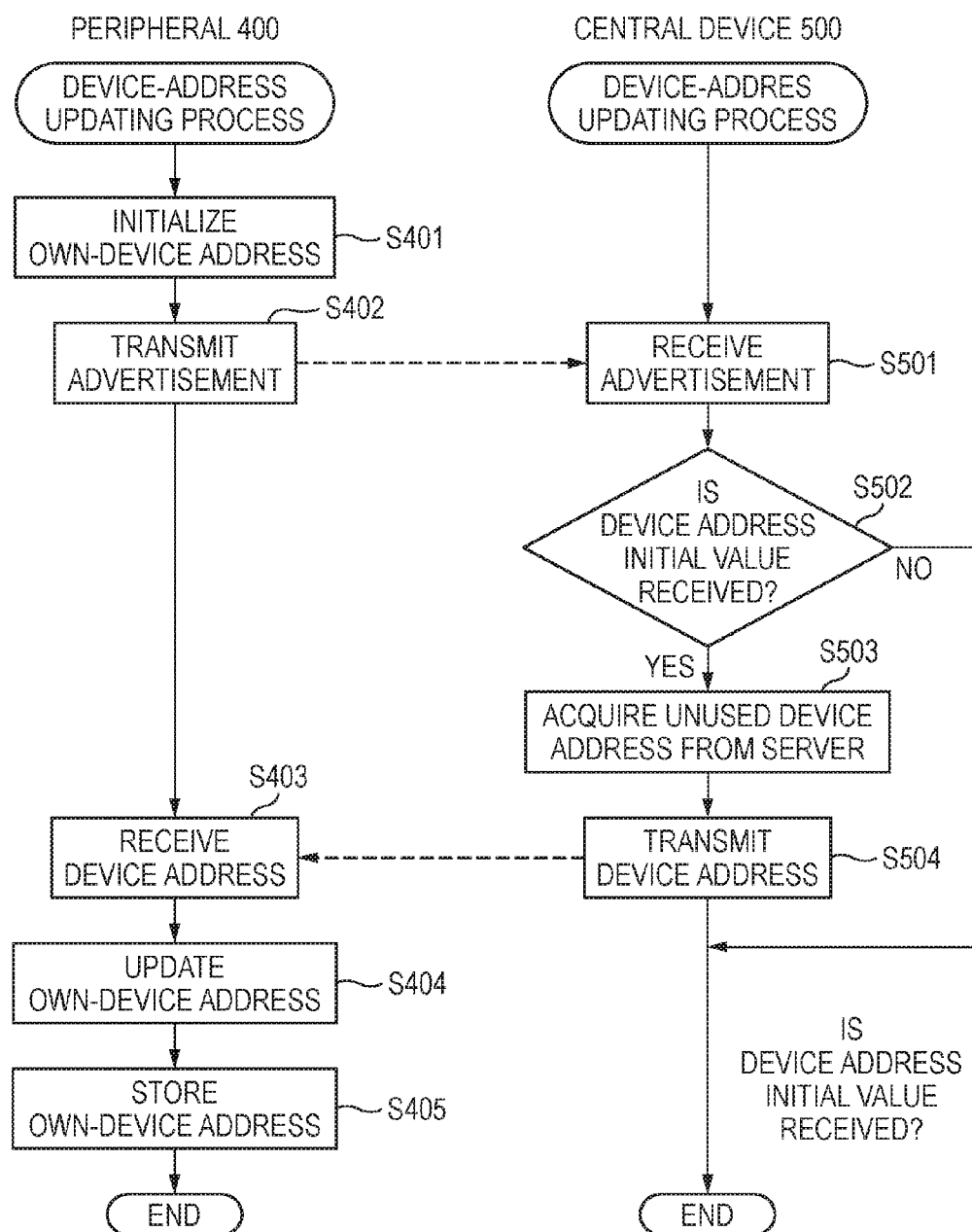
FIG. 10 is a flow chart illustrating an example of a device-address updating process according to the second embodiment.

Now, the own-device address updating process of the peripheral 400 will be described with reference to FIG. 10. This process is performed by cooperation of the own-device address updating unit 424 of the processor 420, the central device 500, and the server 300. This process is performed if the other-device address (for example, the device address of the central device 500) is deleted from the RAM 414 of the wireless communication unit 410 of the peripheral 400.

First, in STEP S401, the own-device address updating unit 424 of the processor 420 updates the own-device address stored in the RAM 414, by initializing the own-device address to the initial value (0xD1D1D1D1D1D1) of the own-device address stored in the ROM 415.

Subsequently, in STEP S402, the processor 420 of the peripheral 400 transmits the advertisement to the central device 500. This process is performed by the advertisement transmitting unit 121. Also, the advertisement includes the initialized own-device address (the device address of the peripheral 400).

Then, in STEP S501, the processor 520 of the central device 500 receives the advertisement through the wireless communication unit 510. The advertisement receiving unit 221 scans cannels of a frequency band in which the advertisement can be transmitted, whereby the advertisement is received.

Subsequently, in STEP S502, the processor 520 of the central device 500 determines whether the received other-device address (the device address of the peripheral 400) is the initial value. This determination is performed based on whether the received other-device address is the same as the initial value of the device address stored in the RAM 530.

In a case of determining that the received other-device address is not the initial value ("No" in STEP S502), the processor 520 of the central device 500 skips the subsequent processes (STEPS S503 and S504), and finishes the device-address updating process.

Meanwhile, in a case of determining that the received other-device address is the initial value ("Yes" in STEP S502), the device-address acquiring unit 525 of the processor 520 of the central device 500 requests the server 300 to transmit an unused device address. Thereafter, in STEP S503, the device-address acquiring unit 525 of the processor 520 of the central device 500 controls the wireless communication unit 510 such that the wireless communication unit receives an unused device address from the server 300, thereby acquiring the unused device address.

If the device-address acquiring unit 525 acquires the unused device address, in STEP S504, the processor 520 of the central device 500 controls the wireless communication unit 510 such that the wireless communication unit transmits the acquired device address to the peripheral 400.

Then, in STEP S403, the processor 420 of the peripheral 400 controls the wireless communication unit 410 such that the wireless communication unit receives the unused device address from the central device 500.

After a connection between the peripheral 400 and the central device 500 for communication is established, in STEP S404, the own-device address updating unit 424 of the processor 420 of the peripheral 400 updates the own-device address having the initial value, with the unused own-device address received from the central device 500. Subsequently, in STEP S405, the own-device address updating unit stores the updated own-device address in the RAM 130 and the RAM 414 of the wireless communication unit 410. The connection between the peripheral 400 and the central device 500 for communication is established by transmitting a connection request from the central device 500 to the peripheral 400 after the reception of the advertisement in STEP S501 before STEP S504.

Until now, the own-device address updating process of the peripheral 400 has been described. The pairing-operation process of the peripheral 400 and the central device 500 can be the same as that of the first embodiment, and a detailed description thereof will not be made. Hereinafter, the advantages of the present embodiment as compared to the first embodiment will be described.

In the above described first embodiment, the number of values which can be taken as the own-device address which is generated by the peripheral 100 is about $274\times10^{11}$. Since the own-device address is generated in random from those many values, the possibility that a duplicate of the value of the own-device address could exist is very low. However, in the strict sense, the possibility that a duplicate of the value of the own-device address could exist is not zero.

The possibility that a duplicate of the value of the own-device address could exist is, for example, the possibility that the value of the updated own-device address could be the same as an own-device address which has already been used before the updating, or the possibility that the value of the updated own-device address could be same as an own-device address which has already been used in any other peripheral (not shown) before the updating.

In contrast with this, according to the present embodiment, since each device address which is assigned to the peripheral 400 by the server 300, it is possible to prevent the possibility that a duplicate of the value of the own-device address which is used for updating in the peripheral 400 could exist.

As an example for preventing a duplicate of the value of the own-device address, for example, the server 300 may be configured to generate device addresses whose values increase or decease in the order in which they are issued.

In a case of generating device addresses whose values increase in the order in which they are issued, those values may be, for example, 0xC00000000000, 0xC00000000001, 0xC00000000002, and the like.

In a case of generating device addresses whose values decrease in the order in which they are issued, those values may be, for example, 0xFFFFFFFFFFFF, 0xFFFFFFFFFFFE, 0xFFFFFFFFFFFD, and the like. However, a device address which is first issued is not limited to those examples, and issuing may start with any other value. Also, the server 300 needs to be configured so as not to use the initial value of the device address when generating a new device address.

The server 300 may be configured to transmit the device address generated as described above, to the central device 500, using the own-device address assigned to the peripheral 400. In this case, since used device addresses which have already been issued cannot be used, there is no possibility that a duplicate of the own-device address could exist. Also, whenever a device address is issued, the number of used device addresses increases; however, it is difficult to use all of a huge number of addresses from 0xC00000000000 to 0xFFFFFFFFFFFF.

As another example for preventing a duplicate of the value of the own-device address, for example, the server 300 may be configured to determine whether a device address to be newly issued is the same as one of used device addresses issued in the past, and transmit the device address, as the own-device address assigned to the peripheral 400, to the central device 500, if the device address is not the same as any of the used device addresses. Even in this case, similarly in the above described example, there is no possibility that a duplicate of the own-device address could exist. Also, the configuration of the server 300 can be appropriately modified as long as it is possible to prevent a duplicate of the own-device address.

Although the embodiments have been described above, the above described embodiments (the first embodiment and the second embodiment) are just examples. Therefore, the detailed configurations of the peripherals 100 and 400, the central devices 200 and 500, and the server 300, the contents of processing thereof, and the like are not limited to those described in the embodiments. Hereinafter, modifications of the above described embodiments will be described.

(Modifications)

In the first embodiment, the processor 120 of the peripheral 100 performs the own-device address updating process using the time measured by the time measuring unit 170 and the count value of the clock-signal generating unit 180. However, a method of generating a random value for rewriting the own-device address is not limited to that method.

For example, it is possible to provide a function of generating a random number, to the processor 120 of the peripheral 100, and rewrite the own-device address based on the random number. In this case, as compared to a case of using values based on the timing of updating (a measured time and a count value) like in the above described embodiments, it is possible to increase the randomness of values for rewriting the own-device address.

Also, rewrite portions of the own-device address are not limited to the portions described in the embodiments, such as the octet 0, the octet 1, and the octet 5, or the octet 2, the octet 3, and the octet 5. Rewrite portions (such as digit or bit positions) of the own-device address can be appropriately modified.

In the first embodiment, in the own-device address updating process, the value of the "○" portion of the octet 5 is rewritten w with "C" in the range between 1 second to 14 seconds, with "D" in the range between 15 seconds and 29 seconds, with "E" in the range between 30 seconds and 44 seconds, and with "F" in the range between 45 seconds and 59 seconds. However, rewriting of the "○" portion of the octet 5 is not limited to that rule. It is also possible to arbitrarily divide the range for seconds into four sections associated with the values "C" to "F".

Also, in the first embodiment, in the own-device address updating process, the own-device address is rewritten based on the second(s) of the measured time. However, the own-device address may be rewritten based on the minute(s) of the measured time. As long as the own-device address may be rewritten based on any other random value which is generated at the timing of updating as described above, any other method of generating a random value can be used.

In the above described embodiments (the first embodiment and the second embodiment), as the address type of the device address, the random static type is used. However, any other address type can be used.

In the first embodiment, data such as the own-device address and the other-device address is stored in the RAM 114 or the RAM 130 of the peripheral 100, and is stored in the wireless communication unit 210 or the RAM 230 of the central device 200. However, for example, the data such as the own-device address and the other-device address may be stored in the ROMs 115, 140, and 240. In other words, the storage destinations of the data such as the own-device address and the other-device address needs only to be storage units such as ROMs and RAMs. This modification is possible even in the second embodiment.

In the first embodiment, each of the processor 120 and the wireless communication unit 110 of the peripheral 100 is composed of a CPU. However, in the configuration of the peripheral 100, the communication control unit 112 may be configured as a component of the processor 120, not as a component of the wireless communication unit 110, in one CPU constituting the processor. Also, in the configuration of the peripheral 100, the RAM 114 and the ROM 115 of the wireless communication unit 110 may be omitted. In this case, the RAM 130 and the ROM 140 may be configured to act in place of the RAM 114 and the ROM 115. This modification is possible even in the second embodiment.

The processor 120 of the peripheral 100 may be configured to control the display unit 160 such that the display displays the own-device address, and the processor 220 of the central device 200 may be configured to control the display unit 260 such that the display displays the other-device address. In this case, the user can see the device address which is updated by the own-device address updating process of the peripheral 100 on the display unit 160 of the peripheral 100 or the display unit 260 of the central device 200. This modification is possible even in the second embodiment.

The first embodiment has a configuration based on the case where the peripheral 100 cannot store only the device address of one central device 200. In a case where the peripheral 100 can store the device addresses of a plurality of central devices 200 (that is, the peripheral can be paired with a plurality of central devices 200), the own-device address updating process may be performed when all device addresses for which pairing has been completed are deleted from the storage units (the RAM and the ROM) of the peripheral 100.

In this case, it is possible to eliminate the possibility that, when the device address of only one of the plurality of central devices 200 for which pairing has been completed is deleted, the own-device address of the peripheral 100 could be updated, whereby it could be impossible for the peripheral to be connected to the central devices 200 of the remaining device addresses. This modification is possible even in the second embodiment.

In the above described embodiments (the first embodiment and the second embodiment), the central device 200 or 500 may be configured to delete the other-device address (the device address of the paired peripheral 100 or 400 for which pairing has been completed) from the RAM 230 or 530 in a case where there is no record on connection for a long period (for example, 3 years).

In this case, it is possible to suppress the device address of the peripheral 100 or 400 for which pairing has completed from remaining in the RAM 230 or 530 of the central device 200 or 500 even after the pairing of the peripheral 100 or 400 with the central device 200 or 500 is broken.

Also, the central device 500 of the second embodiment may be configured to delete the other-device address from the RAM in a case where there is no record on connection with respect to the other-device address, and notify the server 300 that the other-device address has been deleted. In this case, it is possible to reduce the problem that the number of used device addresses in the server 300 increases.

In the first embodiment, the device address is notified as a portion of the advertisement or the connection request between the peripheral 100 and the central device 200. However, the device address may be notified in other ways. This modification is possible even in the second embodiment.

In the above described embodiments (the first embodiment and the second embodiment), the peripheral 100 or 400 is configured to perform the own-device address updating process or the device-address updating process in a case where the other-device address (the device address of the central device 200 or 500 for which pairing has been completed) from the RAM 114 or 414 or the RAM 130.

However, the present invention is not limited thereto. For example, two modifications can be considered. As the first modification, the peripheral 100 or 400 may be configured to perform the own-device address updating process or the device-address updating process in a case of receiving an instruction (a user's operation) for changing the area of the RAM 114 or 414 or the RAM 130 retaining the other-device address. However, in this case, the RAM 114 or 414 or the RAM 130 needs to be configured such that an area for other-device addresses for which pairing has been completed is different from an area for other-device addresses for which pairing has been not completed.

Also, as the second modification, the peripheral 100 or 400 may be configured to perform the own-device address updating process or the device-address updating process in a case of receiving an instruction for updating the other-device address stored in the RAM 114 or 414 or the RAM 130 with a value representing that the other-device address has been excluded from connection destinations. The value representing that the other-device address has been excluded from connection destinations is a predetermined value. In this case, the peripheral 100 or 400 needs to be configured to be able to recognize that the other-device address having the value representing that the other-device address has been excluded from connection destinations, as an other-device address for which pairing has not been completed.

As can be seen from the two modifications described above, the peripheral 100 or 400 may be configured such that, in a case where the peripheral 100 or 400 receives an instruction for excluding the other-device address stored in the RAM 114 or 414 or the RAM 130 (a user's operation for breaking the pairing), the own-device address updating process or the device-address updating process is performed.

In the above described embodiments (the first embodiment and the second embodiment), the peripheral 100 or 400 and the central device 200 or 500 for performing wireless communication with each other based on BLE has been described as examples of wireless communication devices. However, the present invention is not limited to wireless communication devices configured to perform wireless communication based on BLE. For example, the present invention can be applied to wireless communication devices configured to perform wireless communication based on other standards such as Wi-Fi (a trademark) or ZigBee (a trademark).

Also, the peripherals 100 and 400 and the central devices 200 and 500 according to the present invention are not limited to the above described devices. For example, computers can implement the functions of the peripherals 100 and 400 and the functions of the central devices 200 and 500 by executing programs. The programs for implementing the functions of the peripherals 100 and 400 and the functions of the central devices 200 and 500 may be stored in computer-readable recording media such as a USB (Universal Serial Bus) memory, a CD-ROM (Compact-Disc Read-Only Memory), a DVD (Digital Versatile Disc), and an HDD (Hard Disc Drive), and may be downloaded to computers through a network.

Although the preferred embodiments of the present invention have been described, the present invention is not limited to the related specific embodiments, and includes the inventions disclosed in claims and their equivalents. Hereinafter, the inventions disclosed in the original claims of this application will be appended.

What is claimed is:

1. A wireless communication device comprising:
   a wireless communication unit that performs near field communication with another wireless communication device;
   a storage unit that stores an other-device address which is identification information of said another wireless communication device and which is acquired through the wireless communication unit; and a processor that updates an own-device address which is identification information of the wireless communication device, when receiving an instruction for excluding the other-device address from a connection destination of the near field communication.

2. The wireless communication device according to claim 1, wherein:
the instruction for excluding the other-device address from the connection destination is an instruction for deleting the other-device address from the storage unit.

3. The wireless communication device according to claim 1, wherein:
the instruction for excluding the other-device address from the connection destination is an instruction for changing an storage area of the storage unit retaining the other-device address.

4. The wireless communication device according to claim 1, wherein:
the instruction for excluding the other-device address from the connection destination is an instruction for updating the other-device address stored in the storage unit, with a value representing that the other-device address is excluded from the connection destination.

5. The wireless communication device according to claim 1, wherein:
when receiving the instruction for excluding the other-device address from the connection destination, the processor updates the own-device address to an initial value, and updates the updated own-device address with identification information represented by a reception signal received by the wireless communication unit.

6. The wireless communication device according to claim 1, wherein:
the processor updates the own-device address based on a random number.

7. The wireless communication device according to claim 1, wherein:
the processor updates the own-device address with a value based on a timing of updating.

8. The wireless communication device according to claim 7, further comprising:
a time measuring unit that measures time,
wherein the processor updates the own-device address with a value based on the timing of updating, by using a time measured by the time measuring unit.

9. The wireless communication device according to claim 1, wherein:
when the processor updates the own-device address, the processor changes a different portion of the own-device address based on whether a power of the communication unit is in an ON state or an OFF state.

10. The wireless communication device according to claim 2, wherein:
when the processor updates the own-device address, the processor changes a different portion of the own-device address based on whether a power of the communication unit is in an ON state or an OFF state.

11. The wireless communication device according to claim 3, wherein:
when the processor updates the own-device address, the processor changes a different portion of the own-device address based on whether a power of the communication unit is in an ON state or an OFF state.

12. The wireless communication device according to claim 4, wherein:
when the processor updates the own-device address, the processor changes a different portion of the own-device address based on whether a power of the communication unit is in an ON state or an OFF state.

13. The wireless communication device according to claim 6, wherein:
when the processor updates the own-device address, the processor changes a different portion of the own-device address based on whether a power of the communication unit is in an ON state or an OFF state.

14. The wireless communication device according to claim 7, wherein:
when the processor updates the own-device address, the processor changes a different portion of the own-device address based on whether a power of the communication unit is in an ON state or an OFF state.

15. The wireless communication device according to claim 1, further comprising:
a display unit that displays the own-device address,
wherein the own-device address displayed on the display unit is updated with a different value by the processor.

16. An electronic timepiece comprising the wireless communication device according to claim 1.

17. The electronic timepiece according to claim 16, wherein:
said another wireless communication device is a wireless communication terminal; and
the wireless communication unit performs the near field communication with the wireless communication terminal.

18. A wireless communication method between one wireless communication device and another wireless communication device, the method comprising:
storing an other-device address which is identification information of said another wireless communication device acquired by near field communication; and
updating an own-device address which is identification information of the wireless communication device, when receiving an instruction for excluding the other-device address stored in the storing from a connection destination of the near field communication.

* * * * *